United States Patent [19]
Perisic

[11] Patent Number: 4,609,253
[45] Date of Patent: Sep. 2, 1986

[54] DUAL SCREEN SYSTEM

[76] Inventor: Zoran Perisic, "Gwynfenton", White Well, St. Teath, Nr Bodmin, Cornwall, United Kingdom

[21] Appl. No.: 538,923

[22] Filed: Oct. 4, 1983

[30] Foreign Application Priority Data

Oct. 5, 1982 [GB] United Kingdom ............ 8228412

[51] Int. Cl.⁴ ............................................. G02B 27/14
[52] U.S. Cl. ..................................... 350/174; 350/169
[58] Field of Search ............. 350/169, 171, 172, 174; 353/30, 34

[56] References Cited

U.S. PATENT DOCUMENTS 3,666,346  5/1972  Lucas ................................. 350/174

FOREIGN PATENT DOCUMENTS 234452   5/1925  United Kingdom .
255061   9/1927  United Kingdom .
285036   1/1929  United Kingdom .
887978   1/1962  United Kingdom .
1209640 10/1970  United Kingdom .
1553582 10/1979  United Kingdom .

Primary Examiner—John K. Corbin
Assistant Examiner—P. M. Dzierzynski
Attorney, Agent, or Firm—Brown, Martin & Haller

[57] ABSTRACT

A dual screen filming apparatus has a fully reflective mirror positioned in the optical path of part of a projected image at an angle of 45°. The mirror reflects the part of the projected image onto a first front projection screen set at 90° to the path of the reflected image. The mirror also has a non-reflecting portion which lies in the path of the remainder of the projected image and is arranged to allow the light to pass therethrough without reflection onto a second front projection screen. The light reflected from the first and second screens is collected by a semi-reflective mirror, positioned intermediate the projector, and the fully reflective mirror and is directed into the lens of a camera to provide a composite image.

13 Claims, 4 Drawing Figures

DUAL SCREEN SYSTEM

This invention relates to a dual screen method of filming and to a beamsplitter assembly for use in such a method.

At present a dual screen system is set up as shown in FIG. 1 with two screens 1 and 2 set at right-angles to one another. A beamsplitter 3, in form of a semi-silvered mirror, is set at 45° to the screens 1 and 2 and also to the optical axes of a camera 4 and a projector 5. Approximately half the amount of light of the projected beam from the projector 5 is reflected by the beamsplitter 3 towards the front projection screen 1, while the other half, or secondary beam, is transmitted through the beamsplitter to the secondary front projection screen 2. By placing a large dioptre lens 6 in the optical path between the beamsplitter 3 and the secondary front projection screen 2, the secondary beam can be brought into focus at a relatively short distance from the projector 5, thus enabling the secondary screen 2 to be much smaller so that it can be easily attached to the projector/camera assembly. In this way scenes which would normally require very large front projection screens can be filmed on relatively small screens, by complementary masking of the images reflected from the two screens using male and female masks 7 and 8 respectively. It also makes lighting easier because the spill light has to be kept off a smaller area and the lights can be brought in nearer to the subjects. Consequently, frontlighting is possible to a greater degree than if only one large screen were to be used. The increased brightness of the reflected image of the secondary screen 2 due to the unequal distances between the projector 5 and respective screens 1 and 2 is countered by two graduate neutral density filters 9 which achieve the correct balance.

However, there are some drawbacks to the present dual screen system. Firstly, because the secondary beam has to pass through the clear glass of the beamsplitter 3, after being reflected from the secondary screen 2 and before being reflected into the lens of the camera 4 by the silver coated side of the beamsplitter 3 a certain amount of ghosting appears over the image. The reason is that a certain amount of light is reflected by the uncoated glass surface of the beamsplitter 3 itself and so produces a faint image which is not quite in register with the main image. The result is poor resolution of the main image. This effect can be minimised to a certain extent either by using a special coating on the nonreflecting side of the beamsplitter 3 or by use of extremely thin beamsplitters (pellicles), or a beamsplitter in the form of a prismatic cube.

A second drawback lies in the matching of the masks 7 and 8 which obscure the unwanted areas from each of the screens 1 and 2. Masks placed at equal distances, on either side of the beamsplitter 3, normally have equally soft edges. However, since the dioptre lens 6 is usually close to the beamsplitter 3 the mask 8 for the secondary screen image has to lie in the optical path between the beamsplitter 3 and the secondary screen 2 and thus it appears sharper. The mask used in front of the primary screen 1 has to be moved away from the camera lens until the sharpness of its edge matches that of the second mask. This matching is often difficult and time consuming in order to achieve the two images blended together.

An object of the present invention is to provide an improved dual screen method and an improved beamsplitter assembly which overcome the drawbacks of the existing system.

According to the present invention a method of dual screen filming comprises projecting an image positioning first reflective means in the optical path of the projected image at an angle thereto so as to reflect only a portion of the projected image onto a first front projection screen, positioning a second front projection screen in the optical path of the portion of the projected image unreflected by the reflective means, and collecting the portions of the projected image reflected from the first and second front projection screens upon a second reflective means which directs the light into the lens of a camera whereby a composite image is formed.

More particularly the method comprises projecting an image, positioning a fully reflective means in the optical path of the projected image at an angle of 45° thereto so as to reflect only a portion of the projected image onto a first front projection screen set at 90° to the path of the reflected light, providing the fully reflective means with a non-reflective area, positioning a second front projection screen in the optical path of the unreflected portion of the projected image which passes through the non-reflective area and at an angle of 90° to the path of the unreflected portion of light, collecting the portions of the projected image reflected from the first and second front projection screens upon a second, semi-reflective, means set at 45° to the reflected light path and in the optical path between the projector and the first reflective means, the projected beam passing therethrough upon its passage to the first reflective means, and reflecting the collected light into the lens of a camera whereby a composite, image is formed.

The invention also includes a beamsplitter assembly for a dual screen system providing automatic masking comprising a first reflective surface means and a substantially parallel second reflective surface means, the first reflective surface means having a portion thereof fully reflective with the reflective surface confronting the second reflective surface means and a non-reflective portion through which light may pass, and the second reflective surface means being semi-reflective and having its reflective surface confronting the first reflective surface means.

The first reflective surface means preferably comprises a fully silvered mirror the coating of part of which is removed to provide the non-reflective portion. Alternatively, the first reflective surface means may not extend over the entire area to be covered by the projected beam of light.

Preferably the first reflective surface means is movable in two-dimensional coplanar displacement by orthogonally-arranged pairs of traverse bars. The movement may be synchronised with the frames of a projected picture in order to provide automatically aligning movable masking.

The invention will now be described by way of example with reference to the accompanying drawings in which.

Figure 4:
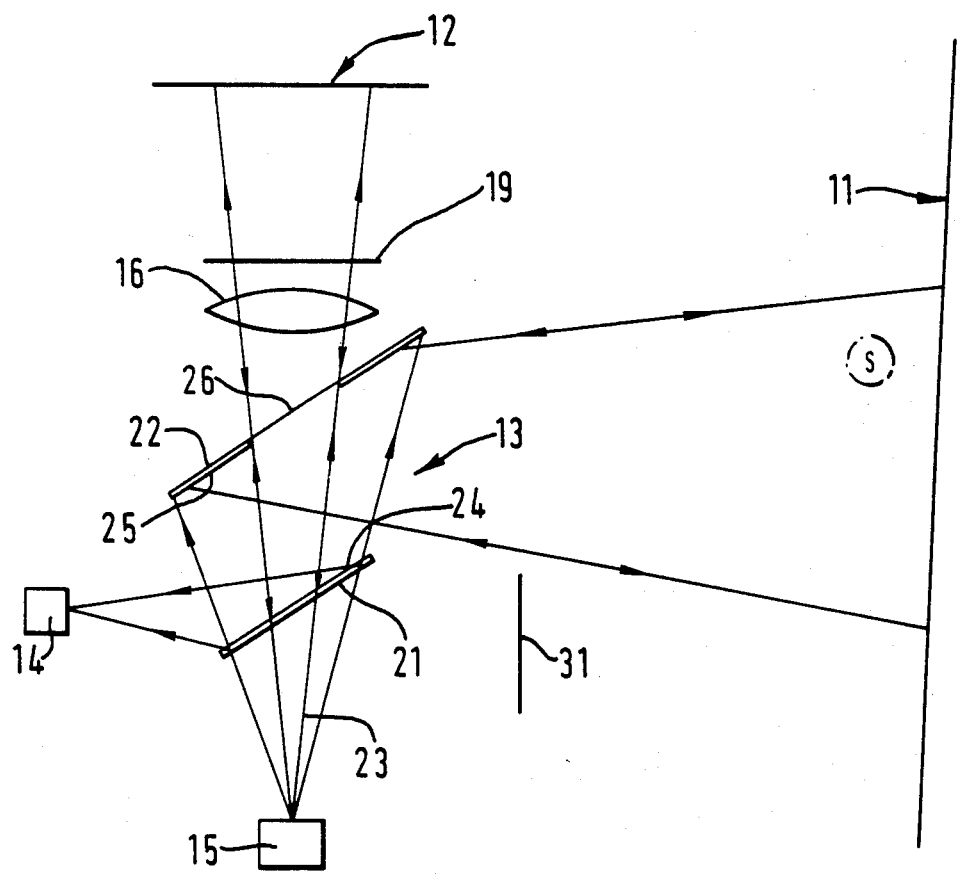
FIG. 4 is a diagrammatic view of the dual screen system using the beamsplitter assembly of the present invention.

In the dual screen system of the present invention, referring firstly to FIG. 4, the two primary and secondary front projection screens 11, 12 are positioned as before, and the camera 14 and projector 15 are set at right-angles to one another. However, in the present invention, instead of being a single semi-silvered mirror, the beamsplitter assembly 13 comprises two mirrors 21 and 22. The mirror 21 is a semi-silvered mirror positioned at 45° to the optical path of the projected beam 23 and has its clear glass surface facing the projector 15 with the coated surface 24 facing downstream. The mirror 22 is 100% silvered mirror and is disposed parallel to the first mirror 21. The mirror 22 has its front surface 25 coated but a portion 26 thereof is uncoated so as to have no reflective surface. Downstream of the beamsplitter assembly 13 is a large dioptre field lens 16 and two graduated neutral density filters 19 as previously disclosed.

As can be seen from FIG. 4 the projected beam 23 passes through the mirror 21 to the mirror 22. At the mirror 22 part of the beam passes through the uncoated portion 26 to the secondary screen 12 whilst the remainder of the beam 24 is reflected by the surface 25 onto the primary front projection screen 11. The two portions of the beam 23 are then reflected by their respective screens 11 and 12 back along their paths until they are reunited at the mirror 22 and then reflected into the lens of the camera 14 by the silver coating of the mirror 21.

In this way no "ghosting" occurs because the light passing into the camera lens is only light reflected by the coated surfaces of the mirrors 21 and 22. Moreover, the masking is automatically provided with no matching of male and female masks.

Figure 1:
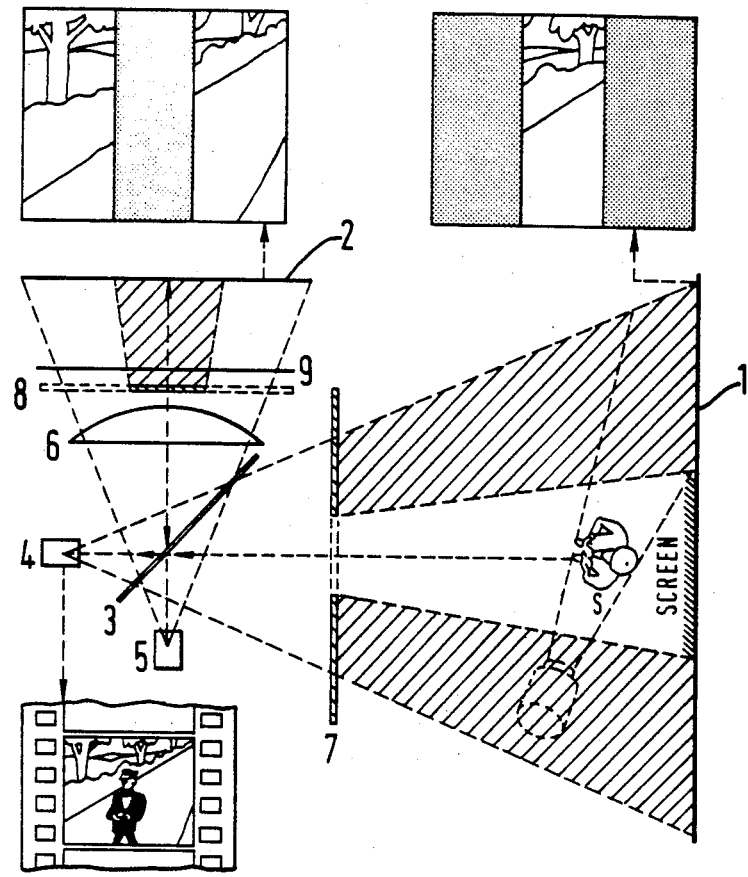
FIG. 1 illustrates the prior art method as described above.
Figure 2:
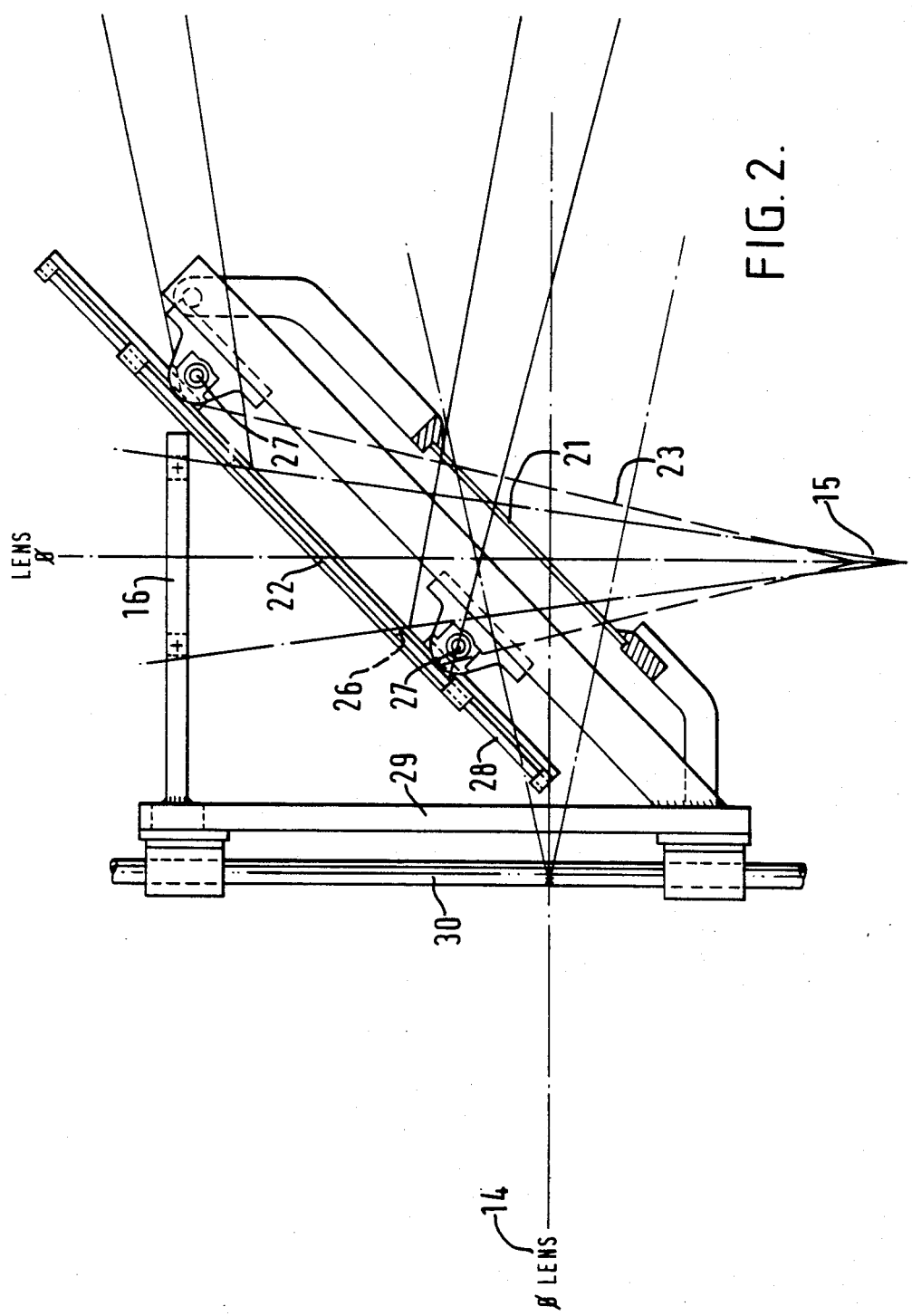
FIG. 2 is a side elevation of a beamsplitter assembly of the present invention.
Figure 3:
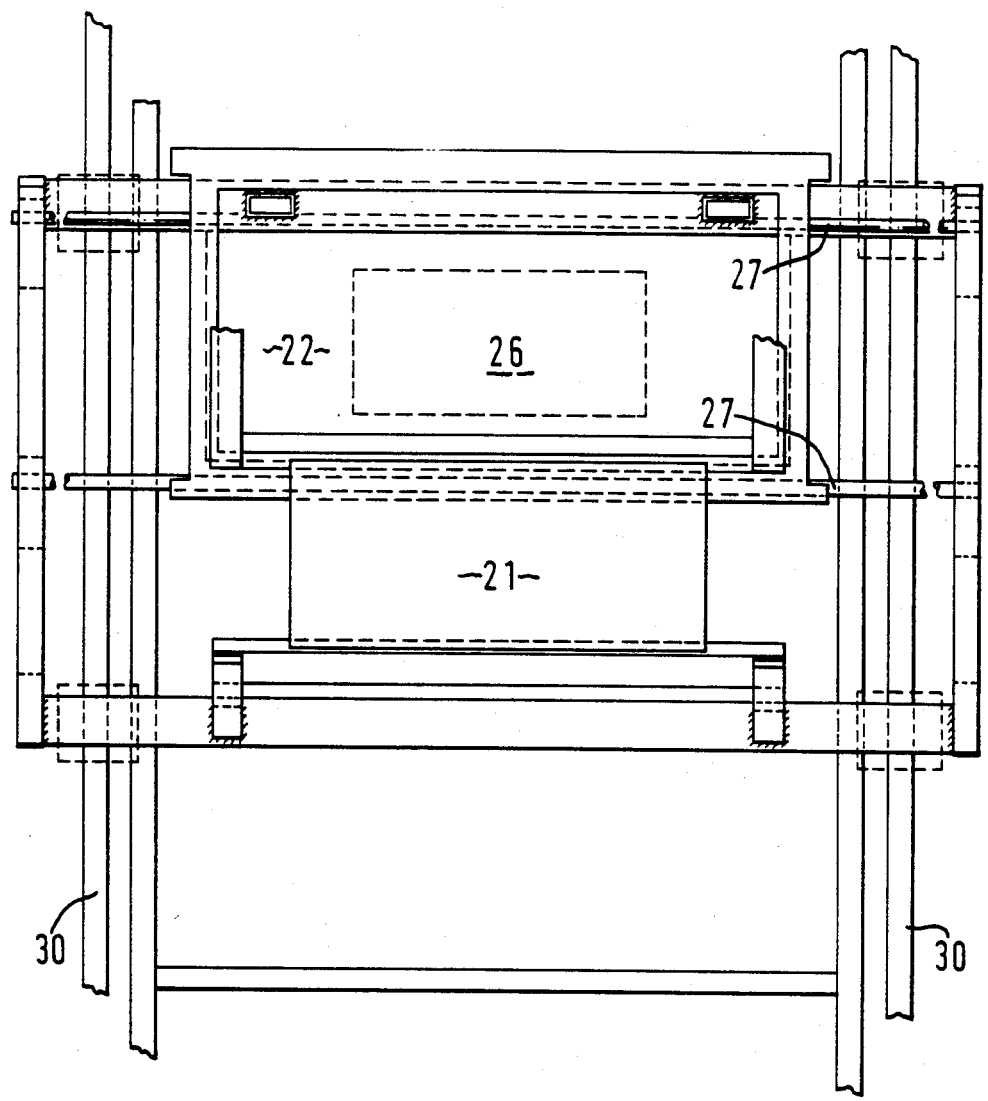
FIG. 3 is an end view of the beamsplitter assembly of FIG. 2.

In order to provide movable masking the mirror 22 is preferably movable upon a frame as illustrated in FIG. 2. From that figure it will be seen that the mirror 22 is movable, in known manner, upon two pairs orthogonally arranged rails 27 and 28 so as to adopt any desired position relative to the projected beam 23. Suitably the two mirrors 21, 22 and the field lens 16 are all mounted upon the same frame 29 adjustable upon shafts 30 and the secondary front projection screen 12 may be movable for focussing. If desired the movement of the mirror, which is self-masking, may be synchronised with the movement of the projected image by computer control which is time programmable per frame of projected film: in this way the masking will be exact and completely self-aligning thus providing complete compatibility of the composite image.

In the embodiment of FIG. 4 it will be appreciated that a certain amount of the projected image will be reflected by the mirror 21. In order to prevent this light from being picked up by the camera 14, the lens of which lies on the same axis as the reflected light, a light trap 31 is provided. In a modification the light trap may be replaced by a third screen aligned with the camera 14 on the other side of the mirror 21 so to introduce additional effects such as pre-flashing, tinting or any overlays, (for example, clouds could be painted on a black screen as an overlay lit from the front or a similar effect could be produced using a transparency lit from behind). Although the image on the third screen would be an out-of-focus image, a focussed image could be obtained by providing a condensor lens between the mirror 21 and the third screen to bring the image into focus. Alternatively, a neutral density filter may be provided to lose the projected image light altogether.

Although the preferred arrangement has been disclosed with the mirrors, screens and optical axes at 45° and 90° to one another for convenience, different appropriate angles may be adopted if desired.

I claim:

1. A method of dual screen filming comprising projecting an image positioning first reflective means in the optical path of the projected image at an angle thereto so as to reflect only a portion of the projected image onto a first front projection screen, positioning a second front projection screen in the optical path of the portion of the projected image unreflected by the first reflective means, and collecting the portions of the projected image reflected from the first and second front projection screens upon a second reflective means which directs the light into the lens of a camera whereby a composite image is formed.

2. A method of dual screen filming comprising projecting an image, positioning a fully reflective means in the optical path of the projected image at an angle of 45° thereto so as to reflect only a portion of the projected image onto a first front projection screen set at 90° to the path of the reflected light, providing the fully reflective means with a non-reflective area, positioning a second front projection screen in the optical path of the unreflected portion of the projected image which passes through the non-reflective area and at an angle of 90° to the path of the unreflected portion of light, collecting the portions of the projected image reflected from the first and second front projection screens upon a second, semi-reflective, means set at 45° to the reflected light path and in the optical path between the projector and the first reflective means, the projected beam passing therethrough upon its passage to the first reflective means, and reflecting the collected light into the lens of a camera whereby a composite, image is formed.

3. Dual screen filming apparatus comprising first reflective means for positioning in the optical path of a projected image at an angle thereto and arranged so as to reflect only a portion of the projected image onto a first front projection screen, a second front projection screen for positioning in the optical path of the portion of the projected image unreflected by the first reflective means, and second reflective means for collecting the portions of the projected image reflected from the first and second front projection screens and for directing the collected light along the optical axis of the lens of a camera.

4. Apparatus according to claim 3 wherein the first reflective means comprises a fully reflective mirror.

5. Apparatus according to claim 4 wherein the mirror has a portion thereof uncoated so that a portion of projected light passes therethrough.

6. Apparatus according to claim 3, wherein the second reflective means comprises a semisilvered mirror.

7. Apparatus according to claim 3 wherein the first reflective means is a fully reflective mirror having its upstream surface reflectively coated, the second reflective means is a semi-silvered mirror with its downstream surface reflectively coated, the first reflective means has an area which is uncoated for light to pass through unreflected, the first and second screens are positioned at 90° to another, and the first and second reflective means are parallel to one another and positioned at 45° to each of the first and second screens.

8. Apparatus according to claim 3 including lens means between the first reflective means and the second screen.

9. Apparatus according to claim 8 including neutral density filter means between the lens means and the second screen.

10. A beamsplitter assembly for a dual screen system providing automatic masking comprising a first reflective surface means and a substantially parallel second reflective surface means, the first reflective surface means having a portion thereof fully reflective with the reflective surface confronting the second reflective surface means and a non-reflective portion through which light may pass, and the second reflective surface means being semireflective and having its reflective surface confronting the first reflective surface means.

11. An assembly according to claim 10 wherein the first reflective surface means comprises a fully silvered mirror part of which is not coated to provide the non-reflective portion.

12. An assembly according to claim 10 wherein the first reflective surface means includes a fully reflective surface which does not extend over the entire area to be covered by a beam of light projected by a projector, the non-reflective portion comprising the uncovered area.

13. An assembly according to claim 10 wherein the first reflective surface means is movable in two-dimensional coplanar displacement by orthogonally-arranged pairs of traverse bars.

* * * * *